(12) United States Patent
Karau

(10) Patent No.: US 8,790,607 B2
(45) Date of Patent: Jul. 29, 2014

(54) METHOD FOR PURIFYING ELEMENTAL BORON

(75) Inventor: Friedrich Wilhelm Karau, Goslar (DE)

(73) Assignee: H. C. Starck GmbH, Goslar (DE)

(*) Notice: Subject to any disclaimer, the term of this patent is extended or adjusted under 35 U.S.C. 154(b) by 0 days.

(21) Appl. No.: 13/061,953

(22) PCT Filed: Aug. 28, 2009

(86) PCT No.: PCT/EP2009/061154
§ 371 (c)(1),
(2), (4) Date: Apr. 4, 2011

(87) PCT Pub. No.: WO2010/026111
PCT Pub. Date: Mar. 11, 2010

(65) Prior Publication Data
US 2011/0176983 A1 Jul. 21, 2011

(30) Foreign Application Priority Data
Sep. 5, 2008 (DE) .......................... 10 2008 045 858

(51) Int. Cl.
C01B 35/02 (2006.01)
(52) U.S. Cl.
CPC .................................... *C01B 35/023* (2013.01)
USPC ....................................................... 423/298
(58) Field of Classification Search
USPC ....................................................... 423/298
See application file for complete search history.

(56) References Cited

U.S. PATENT DOCUMENTS 2,998,302 A 8/1961 Mercuri et al.
3,520,482 A 7/1970 Savitski
3,551,105 A * 12/1970 Cooper .......................... 423/298
4,614,637 A 9/1986 Boncoeur et al.
2003/0036482 A1* 2/2003 Thieme et al. ................. 505/100
2005/0159318 A1* 7/2005 Giunchi et al. ............... 505/100
2009/0156410 A1 6/2009 Nakane et al.

FOREIGN PATENT DOCUMENTS

| DE | 1 592 309 | | 6/1970 |
| GB | 1 064 093 | A | 4/1967 |
| GB | 1 272 810 | A | 5/1972 |
| JP | 60-235716 | A | 11/1985 |
| JP | 62-91409 | A | 4/1987 |
| JP | 62-202815 | A | 9/1987 |
| JP | 10-130016 | A | 5/1998 |
| JP | 2004-217463 | A | 8/2004 |
| WO | WO 91/04227 | A1 | 4/1991 |
| WO | WO 03/051773 | A1 | 6/2003 |
| WO | WO 2007/049623 | A1 | 5/2007 |

OTHER PUBLICATIONS

International Preliminary Report on Patentability for PCT/EP2009/061154, Mar. 8, 2011.*
J. Akimitsu et al.: "Superconductivity at 39 K in magnesium diboride", Nature, vol. 410, No. 6824, pp. 63-64 (Mar. 1, 2001).
E. Amberger et al.: "Gmelin Handbook of Inorganic Chemistry", Springer Verlag, 8$^{th}$ Edition, Boron; System No. 13, pp. 7-9, 14-16, 18-20, 24-27 (1981).

* cited by examiner

Primary Examiner — Stanley Silverman
Assistant Examiner — Justin Bova
(74) Attorney, Agent, or Firm — Norman B. Thot

(57) ABSTRACT

Elemental boron with a boron content of at least 96.8% by weight, an oxygen content of at most 1.6% by weight, a nitrogen content of at most 0.2% by weight, a crystallinity of 30% by weight or less, and a particle size distribution with a d100 value of 9 μm or less.

8 Claims, 1 Drawing Sheet

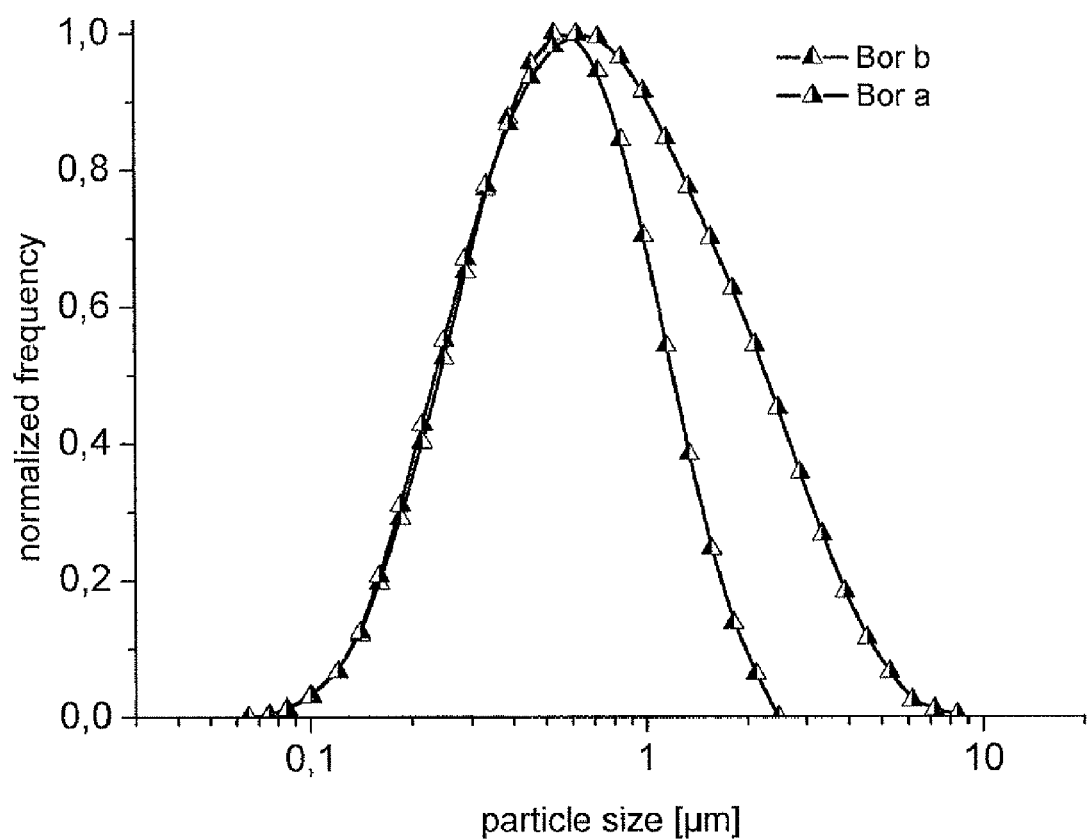

METHOD FOR PURIFYING ELEMENTAL BORON

CROSS REFERENCE TO PRIOR APPLICATIONS

This application is a U.S. National Phase application under 35 U.S.C. §371 of International Application No. PCT/EP2009/061154, filed on Aug. 28, 2009 and which claims benefit to German Patent Application No. 10 2008 045 858.9, filed on Sep. 5, 2008. The International Application was published in German on Mar. 11, 2010 as WO 2010/026111 A1 under PCT Article 21(2).

FIELD

The present invention relates to a method for purifying elementary boron and to the purified boron produced thereby.

BACKGROUND

Boron is used in many technology areas as a result of certain properties such as its high enthalpy of oxide formation, low molecular weight and good chemical stability. Large amounts of amorphous boron are used as an additive in pyrotechnic mixtures. In chemical synthesis, boron is used as a starting material for producing borides and also as a flux material during soldering.

Since January 2001, a discovery by Prof. Akimitsu (Nature, Vol. 410, No. 6824 (2001), 63-64) has created a furor: Prof. Akimitsu found that the well-known chemical compound magnesium diboride ($MgB_2$) has superconductive properties at temperatures below 40 Kelvin. In contrast to so-called cuprate-based superconductors, magnesium diboride exhibits advantageous properties for use as a superconductor in wires and other applications (such as in sintered bodies). Magnesium diboride is usually produced by the reaction of finely divided boron and magnesium powders with one another.

As a result of the method of wire manufacture (inclusion of the magnesium diboride or of a mixture of elemental boron and magnesium in a metal sheath and subsequent drawing and, if appropriate, subsequent heat treatment to achieve a chemical reaction between boron and magnesium to provide magnesium diboride in the case of a mixture of magnesium and boron being used (in situ process) to obtain a metal wire with a magnesium diboride core), various requirements are placed on the magnesium diboride which have hitherto not been achieved. Besides a high fraction of amorphous boron, a high purity, for example, a low content of oxygen, nitrogen, anionic impurities such as chloride or fluoride, but also customary metallic impurities such as alkali metal ions and alkaline earth metal ions and also other metal ions, are required. A relatively small particle size is likewise required, as is the absence of oversized individual particles since these individual particles can lead to the tearing of the wire upon drawing, and impurities can result in a lower current bearing capacity. Oversized individual particles ("oversize") also prevent the complete chemical reaction of the boron with magnesium to give magnesium diboride during the processes that form the basis of the wire manufacture. The chemical reactivity of the boron is furthermore reduced by coating the surface with boron oxide and borates, which is reflected in a longer reaction time and the required higher reaction temperatures. This is a disadvantage, particularly in the case of the in situ process for superconductive wire manufacture.

SUMMARY

Conventional, commercially available boron is usually obtained by reducing boron trioxide with magnesium. An aspect of the present application was therefore to provide a method for the further purification of standard commercial boron so as to allow for further, cost-effective production.

In an embodiment, the present invention provides elemental boron with a boron content of at least 96.8% by weight, an oxygen content of at most 1.6% by weight, a nitrogen content of at most 0.2% by weight, a crystallinity of 30% by weight or less, and a particle size distribution with a d100 value of 9 μm or less.

BRIEF DESCRIPTION OF THE DRAWING

The present invention is described in greater detail below on the basis of embodiments and of the drawing in which:

FIG. 1 shows the particle size distributions of pure boron according to the present invention which has been milled as described herein in the attritor and in a stirred ball mill.

DETAILED DESCRIPTION

It has surprisingly been found that a simple option for purifying pulverulent boron with a low particle size can be achieved through acidic esterification of the impurities with subsequent heat treatment. It has also surprisingly been found that boron purified in this way is suitable for producing magnesium diboride for the manufacture of superconductive wires even if the fraction of crystalline boron in the overall boron used for producing magnesium diboride is up to 30%.

In an embodiment, the present invention provides a method for purifying elemental boron, comprising the following steps:

provision of elemental boron;
milling the elemental boron in the presence of an alcohol so as to obtain a first suspension;
admixing the first suspension with a strong acid that is soluble in the alcohol so as to obtain a second suspension;
heating the second suspension to boiling with reflux cooling so as to obtain a third suspension;
separating off the solid present in the suspension; and
heat-treating the solid under reduced pressure.

In an embodiment of the method of the present invention, the milling is advantageously carried out in an attritor or in a stirred ball mill since in these devices milling in a milling fluid is possible and a small particle size and effective comminution of the oversize particles and also a narrow, monomodal particle size distribution can be achieved. The alcohol used can, for example, be a lower alcohol having 1 to 5 carbon atoms, such as methanol. The strong acid and/or the alcohol can, for example, be anhydrous. Suitable strong acids, for example, all anhydrous acids, such as gaseous hydrogen chloride or toluenesulfonic acid.

Boiling can, for example, be carried out for a period of from about 1 to 24 hours under reflux. The optimum time depends on the individual case and can be ascertained by simple exploratory experiments. The oxygen, which is present in the form of boric acid, boron trioxide and the like on the surface of the boron particles, is thereby esterified with the alcohol. Since this is an equilibrium reaction, the equilibrium should be shifted in the direction of the ester, which can be achieved through various measures. Firstly, the alcohol is used in excess. It is thereby possible to determine how high the oxygen content usually is with it having been here established that the boron comprises at most 2% oxygen. This means 1 kg of boron comprises approximately 20 g of oxygen, corresponding to 1.25 mol.

For an oxygen content of 2%, this corresponds to 0.4165 mol equivalents of $B_2O_3$, corresponding to 0.833 mol of oxidically present boron, assuming that the total oxygen is present in the form of boron trioxide.

The esterification reaction then corresponds, by way of example, to the following equation:

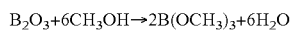

$$B_2O_3 + 6CH_3OH \rightarrow 2B(OCH_3)_3 + 6H_2O$$

Per mole of boron (in the boron oxide), 3 mol of alcohol are thus consumed.

2.499 mol of methanol are thus consumed, corresponding to 80.07 g; this corresponds to 101.36 ml of methanol at a methanol density of 0.79 g/ml. If 1 kg of boron is suspended in approximately 2 liters of methanol, this then corresponds to 0.051% of the amount of alcohol used, meaning that alcohol is clearly used in excess, based on the oxidic impurities in the boron.

As is evident from the reaction equation, the equilibrium can also be shifted in the direction of the ester by working with dry, to the greatest extent possible, anhydrous, alcohol and as anhydrous an acid as possible.

The water which is formed can also, for example, be removed from the condensate, just like the ester which is formed.

This can be effected by, during boiling with reflux cooling, passing the condensate, i.e., the reflux prior to returning it to the reaction mixture, over at least one alkali metal oxide or alkaline earth metal oxide and at least one alkali metal hydroxide or alkaline earth metal hydroxide. The mixture of calcium hydroxide and calcium oxide are, for example, suitable.

This achieves two things: firstly, the water which is formed in the reaction is bound by the alkali metal oxide or alkaline earth metal oxide, and secondly the volatile boric acid ester which is formed is saponified, especially by the alkali metal hydroxide or alkaline earth metal hydroxide, and remains as an insoluble oxygen compound on the alkali/alkaline earth metal oxides and hydroxides used. The removal of water from the suspension is also supported by adding a suitable entrainer which forms azeotropes with water. Suitable entrainers include, for example, ethanol, tert-butanol, 1,2-dichloroethane, diethyl ether, ethyl formate, hexane or ethyl butyl ether. When using methanol, hexane or ethyl formate can, for example, be used.

The boiling under reflux reaction, can, for example, be carried out until boron can no longer be detected in the liquid phase of the reaction mixture. For this purpose, a sample is taken from the reactor, the solid is separated off, and the alcohol is combusted. The reaction is complete as soon as the color no longer exhibits a characteristic green coloration.

The solid is then separated off by filtration, centrifugation or distilling off of the liquid. If the liquid is distilled off, however, no removal of chloride-, fluoride- or iron-containing impurities takes place since the respective impurities are not volatile enough.

Since oxygen is also always present on the surface of the boron particles in chemisorbed form, ester groups are also bonded to the surface. These are expelled by the subsequent heat treatment under reduced pressure, whereby an excessively high temperature or an excessively high pressure leads to the volatile oxygen impurities, which are still present in the form of the ester, being converted to undesired nonvolatile oxygen impurities.

In an embodiment, the process of the present invention can be carried out in vacuum, for example, at a pressure of at most $10^{-3}$ mbar, or not more than $10^{-4}$ mbar.

Heating is carried out slowly in vacuum, for example at a heating rate of at most about 1° C./minute up to 1000° C., or up to 400° C., the heating rate being reduced in the event of the pressure increasing too much as a result of vaporizing oxygen impurities.

The heat treatment is continued in vacuum at the respective end temperature, which is generally 1000° C., for example, 400° C., over a period of from 1 to 3 hours. After the heat treatment, cooling is carried out under an inert gas atmosphere, which must be different from nitrogen, for example, argon or helium.

In an embodiment, the present invention provides purified boron obtainable by the method according to the present invention. After the last heat-treatment step, a completely purified and very reactive surface is present which reacts well with magnesium metal.

In an embodiment, the present invention also provides elemental boron which has a boron content of at least 96.8% by weight, an oxygen content of at most 1.6% by weight, a nitrogen content of at most 0.2% by weight, a crystallinity of 30% by weight or less and a particle size distribution with a d100 value of 9 μm or less, for example, 6 μm or less.

The content of anionic impurities is at most 0.4% by weight, whereby chloride or fluoride are present in amounts of at most 0.2% by weight in each case. The boron according to the present invention comprises at most 1.0% by weight, for example, 0.8% by weight, of metallic impurities, which are in most cases alkali metal or alkaline earth metal or a metal of the fourth period of the Periodic Table of Elements. These can be present as impurities in elemental form or in ionic form. The content of alkali metal is at most 0.4% by weight, for example, at most 0.3% by weight. This is potassium and/or magnesium in most cases, where potassium may be present in amounts of less than 0.3% by weight and magnesium may be present in amounts of up to 0.4% by weight.

The metal of the fourth period of the Periodic Table of Elements is present in amounts of at most 0.2% by weight, for example, at most 0.1% by weight. The metal can, for example, be iron.

Examples

The starting material used in each case were approximately 1 kg of standard commercial boron, grade I from H. C. Starck. The boron was milled in two different ways in a methanolic suspension (in each case 1 kg of boron per approximately 2 l of methanol), "boron a" in an attritor and "boron b" in a stirred ball mill.

Both suspensions were then further processed in the same way: Firstly, 100 ml of hexane was added to 2 l of suspension. The suspension was saturated with HCl by introducing HCl gas with stirring. The suspension was then boiled under reflux for approximately 10 h and the condensate of the reflux was passed over a contact mass consisting of one part calcium oxide and one part calcium hydroxide. After passing the contact mass, the condensate flowed back again into the boiling suspension. When the reaction was complete, the mixture was left to cool to room temperature and a solid-liquid separation of the suspension was carried out using a standard commercial centrifuge. The solid which was formed was again washed with fresh methanol freed from water by means of known methods, and dried by means of known methods, so that a flowable powder remained. This powder was then passed to the vacuum treatment. The powder was taken to a vacuum furnace and was heated to 400° C. at 1° C. per minute. If the pressure in the furnace exceeded about $10^{-4}$ mbar, the heating rate was reduced until the pressure in the furnace had dropped to below $10^{-4}$ mbar again. When 400° C. was reached, it was left for a further three hours at this temperature, the furnace was then filled with argon and left to cool. The boron which was formed in the process was then only handled under protective gas (here argon).

After the purification, it was found that the magnesium content could be reduced from 0.58% by weight to 0.46% by weight and the oxygen content could be reduced from 1.8% by weight to 1.6% by weight.

The particle size distributions were determined by Fraunhofer diffraction using a Mastersizer S instrument. FIG. 1 shows the particle size distributions of pure boron according to the present invention which were milled as described above in the attritor and in a stirred ball mill.

The boron according to the present invention was used to produce magnesium diboride, which was used to manufacture superconductive wires. Compared with the standard commercial boron grade I, the current bearing capacity in a low field was greater by a factor of 1.1, and in a high field (greater than 3 Tesla) was more than ten times greater.

The present invention is not limited to embodiments described herein; reference should be had to the appended claims.

The invention claimed is:

1. Elemental boron with a boron content of at least 96.8% by weight, an oxygen content of at most 1.6% by weight, a nitrogen content of at most 0.2% by weight, a crystallinity of 30% by weight or less, a particle size distribution with a d100 value of 9 μm or less, and a content of at least one metallic impurity of 0.1 wt.-% to at most 1.0 wt.-%,
wherein, the at least one metallic impurity includes at least one metal of the fourth period of the Periodic Table of Elements in an amount of from 0.1 wt.-% to at most 0.2 wt.-%,
wherein, potassium is present in an amount of from 0.1 wt.-% to less than 0.3 wt.-%.

2. Elemental boron as recited in claim 1, wherein the elemental boron has a content of anionic impurities of at most 0.4% by weight.

3. Elemental boron as recited in claim 2, where the anionic impurities are at least one of chloride and fluoride, and the content of the anionic impurities is at most 0.2% by weight for each of the at least one of chloride and fluoride.

4. Elemental boron as recited in claim 1, wherein the at least one metallic impurity further includes at least one of an alkali metal and an alkaline earth metal, which are respectively not also a metal of the fourth period of the Periodic Table of Elements.

5. Elemental boron as recited in claim 4, wherein the alkali metal is present in an amount of at most 0.4 wt.-% including potassium.

6. Elemental boron as recited in claim 1, wherein the metal of the fourth period of the Periodic Table of Elements is iron.

7. Elemental boron as recited in claim 4, wherein the alkaline earth metal is magnesium present in an amount of up to 0.4 wt. %.

8. A purified elemental boron obtainable by a method comprising:
providing an elemental boron;
milling the elemental boron in the presence of an alcohol so as to obtain a first suspension;
adding a strong acid which is soluble in the alcohol to the first suspension so as to obtain a second suspension;
heating the second suspension to boiling with reflux cooling so as to obtain a third suspension;
separating off a solid in the third suspension; and
heat-treating the solid under reduced pressure so as to provide the purified elemental boron,
wherein the purified elemental boron has a boron content of at least 96.8% by weight, an oxygen content of at most 1.6% by weight, a nitrogen content of at most 0.2% by weight, a crystallinity of 30% by weight or less, a particle size distribution with a d100 value of 9 μm or less, and a content of at least one metallic impurity of 0.1 wt.-% to at most 1.0 wt.-%,
wherein, the at least one metallic impurity includes at least one metal of the fourth period of the Periodic Table of Elements in an amount of from 0.1 wt.-% to at most 0.2 wt.-%,
wherein, potassium is present in an amount of from 0.1 wt.-% to less than 0.3 wt.-%.

* * * * *